(12) United States Patent
Prestenback et al.

(10) Patent No.: US 9,065,870 B2
(45) Date of Patent: *Jun. 23, 2015

(54) METHOD AND SYSTEM FOR PAIRING A MEDIUM TO A USER ACCOUNT

(71) Applicant: Disney Enterprises, Inc., Burbank, CA (US)

(72) Inventors: Kyle Prestenback, Burbank, CA (US); Evan Tahler, San Francisco, CA (US)

(73) Assignee: Disney Enterprises, Inc., Burbank, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/268,660

(22) Filed: May 2, 2014

(65) Prior Publication Data

US 2015/0019683 A1  Jan. 15, 2015

Related U.S. Application Data

(63) Continuation of application No. 12/080,379, filed on Apr. 1, 2008, now Pat. No. 8,781,115.

(51) Int. Cl.

| | |
|---|---|
| H04L 29/06 | (2006.01) |
| H04L 29/08 | (2006.01) |
| H04N 7/173 | (2011.01) |
| H04N 21/258 | (2011.01) |
| H04N 21/4143 | (2011.01) |
| H04N 21/426 | (2011.01) |
| H04N 21/475 | (2011.01) |
| H04N 21/4782 | (2011.01) |
| H04N 21/6334 | (2011.01) |
| H04N 21/6377 | (2011.01) |
| H04N 21/643 | (2011.01) |
| H04N 21/658 | (2011.01) |

(52) U.S. Cl.
CPC .......... *H04L 67/306* (2013.01); *H04N 7/17318* (2013.01); *H04N 21/25808* (2013.01); *H04N 21/25866* (2013.01); *H04N 21/4143* (2013.01); *H04N 21/42646* (2013.01); *H04N 21/42684* (2013.01); *H04N 21/4751* (2013.01); *H04N 21/4782* (2013.01); *H04N 21/63345* (2013.01); *H04N 21/63775* (2013.01); *H04N 21/643* (2013.01); *H04N 21/6582* (2013.01); *H04L 67/12* (2013.01)

(58) Field of Classification Search
CPC .................................................... H04L 67/306
USPC ........................................................ 380/44
See application file for complete search history.

(56) References Cited

U.S. PATENT DOCUMENTS

| | | | |
|---|---|---|---|
| 8,752,090 B2* | 6/2014 | Casey et al. ...................... 725/39 |
| 2006/0020825 A1* | 1/2006 | Grab ............................. 713/193 |
| 2006/0280303 A1* | 12/2006 | Gupte ........................... 380/239 |
| 2008/0152305 A1* | 6/2008 | Ziegler ............................ 386/94 |

* cited by examiner

*Primary Examiner* — Michael S McNally
(74) *Attorney, Agent, or Firm* — Farjami & Farjami LLP

(57) ABSTRACT

There is provided a system for pairing a medium with a user account comprising a media player configured to retrieve a medium identifier from the medium and a player identifier from a memory of the media player. The media player is further configured to transmit the medium identifier and the player identifier to a server. Additionally, the media player is further configured to receive a key associated with the medium identifier and the player identifier from the server. The server is configured to receive the key and the user account for pairing the user account with the medium associated with the key. A computer may be utilized to transmit the key and the user account to the server, after the key has been provided to a user by the media player. The media player and the computer may communicate with the server via the Internet.

20 Claims, 2 Drawing Sheets

METHOD AND SYSTEM FOR PAIRING A MEDIUM TO A USER ACCOUNT

This is a continuation of U.S. patent application Ser. No. 12/080,379, filed Apr. 1, 2008.

BACKGROUND OF THE INVENTION

1. Field of the Invention

The present invention relates generally to media players. More particularly, the present invention relates to user accounts and media associated with media player.

2. Background Art

People have come increasingly to utilize online user accounts, such as user accounts accessible through web pages, to manage information about the media that they purchase or license. For example, a person can utilize a user account to manage information about the music he listens to, the pictures he takes, or the movies he watches. In the past, media consumers might simply have rented or purchased, for example, a movie, watched it, and ended their experience then. In the modern trend, however, the media consumers can broaden their experience through the use of online services.

For example, today, a media consumer can utilize a user account to manage information about a movie in several ways. The media consumer may add a movie to a list of all the movies he or she rents or owns, thereby associating the movie with the user account. He or she may additionally rank the listed movies according to personal preferences, and associate comments with each movie. If the user account is maintained on a website with other user accounts, the person may also be able to see other persons' lists of movies, and rank and make comments about those movies. On such a website, multiple people may also be able to engage in forum-based discussions about movies, leave messages and provide advice to one another about movies, or communicate in other ways about movies or other forms of media. Ultimately, utilization of an online user account by a person can greatly broaden and enhance his movie-watching experience. However, conventionally, a user must access a web site where the user account is maintained, manually log onto the user account, and enter various information about the new media content, such as a new DVD, that he has purchased, in order to associate the new DVD with the user account. The user must perform these tedious tasks for each single DVD that the user purchases, using, for example, a personal computer or a stand-alone media player. But, of course, many users forego taking the time to register yet another product or each instance of media content and, thus, the main advantages of the online user accounts and the associated benefits to the media consumers will not be realized by user account providers and consumers.

Accordingly, there is a need in the art for easing the utilization of media user accounts by the media consumers.

SUMMARY OF THE INVENTION

There are provided methods and systems for pairing a medium to a user account, substantially as shown in and/or described in connection with at least one of the figures, as set forth more completely in the claims.

BRIEF DESCRIPTION OF THE DRAWINGS

The features and advantages of the present invention will become more readily apparent to those ordinarily skilled in the art after reviewing the following detailed description and accompanying drawings, wherein.

DETAILED DESCRIPTION OF THE INVENTION

Figure 1:
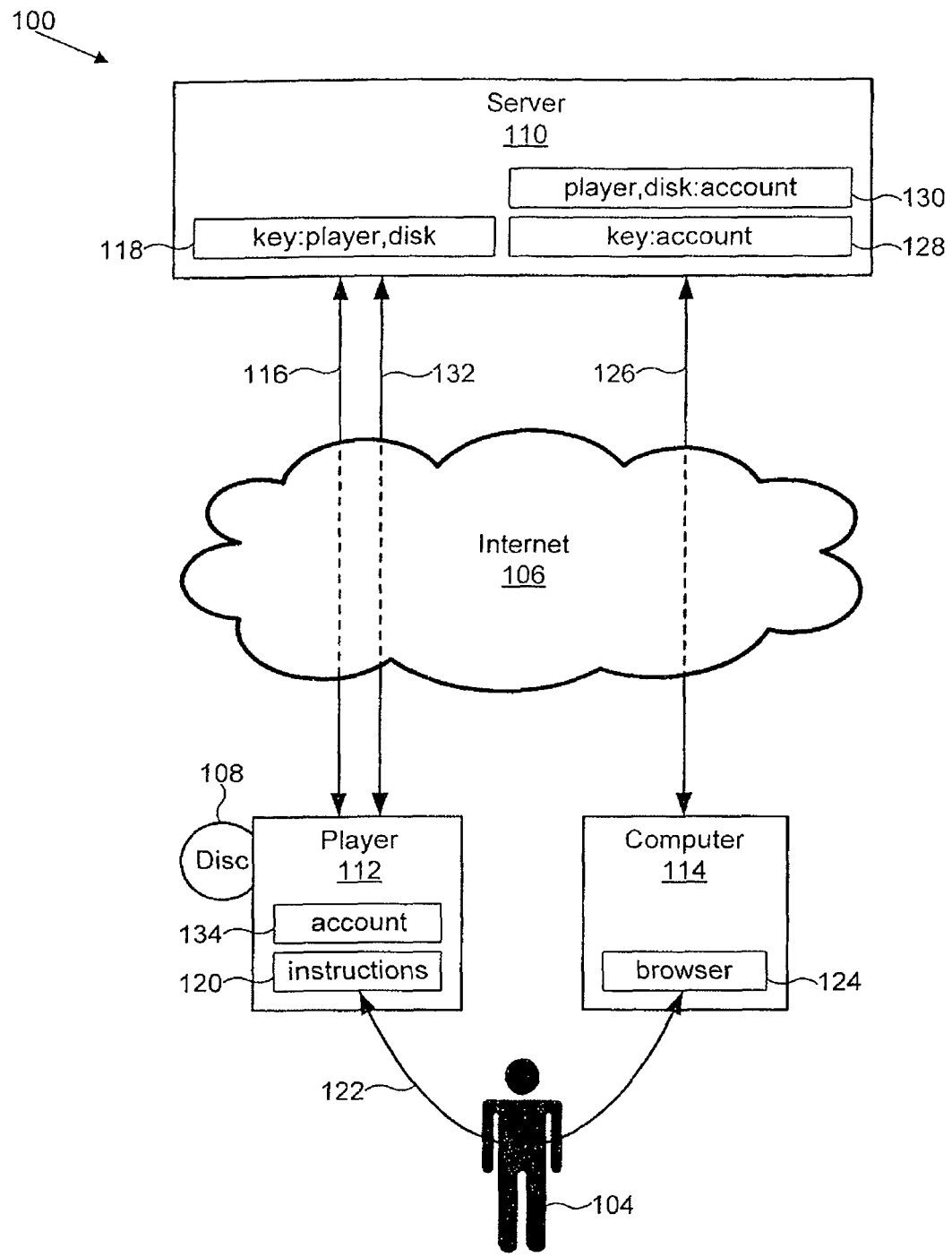
FIG. 1 shows a diagram of an exemplary system for pairing a medium to a user account, according to one embodiment of the present invention.

The present application is directed to methods and systems for pairing a medium to a user account. The following description contains specific information pertaining to the implementation of the present invention. One skilled in the art will recognize that the present invention may be implemented in a manner different from that specifically discussed in the present application. Moreover, some of the specific details of the invention are not discussed in order not to obscure the invention. The specific details not described in the present application are within the knowledge of a person of ordinary skill in the art. The drawings in the present application and their accompanying detailed to description are directed to merely exemplary embodiments of the invention. To maintain brevity, other embodiments of the invention, which Use the principles of the present invention, are not specifically described in the present application and are not specifically illustrated by the present drawings. It should be borne in mind that, unless noted otherwise, like or corresponding elements among the figures may be indicated by like or corresponding reference numerals.

FIG. 1 shows system 100 for pairing a medium to a user account, according to one embodiment of the present invention. System 100 includes medium or disk 108, player 112, and computer 114 for use by user 104. System 100 additionally includes server 110, which engages in transactions 116, 126, and 132 with player 112 and computer 114 via Internet 106. A pairing process, according to one embodiment of the present invention, may comprise transactions 116, 122, 126, and 132.

In this embodiment, medium or disk 108 can be a Blu-ray disk. In other embodiments of the invention, disk 108 could be a CD-ROM music disk, a VHS movie cassette, a DVD movie disk, or an instance of another media format. In addition to storing a movie, disk 108 may additionally store a unique medium identifier or disk identifier, as well as the address of server 110 on Internet 106. After a pairing process is completed, disk 108 will be paired to a user account on server 110.

Player 112 may be a stand-alone media player that is capable of loading disk 108 for pairing and playback. Thus, in this embodiment of the present invention, player 112 can be a Blu-ray player, having a memory for storing a unique player identifier and account record 134 during a pairing process. Player 112 can provide audio-visual output on an electronic display (not shown), which in this embodiment is a standalone LCD screen, and which displays instructions 120 during a pairing process. In other embodiments of the present invention, the display of player 112 could be a CRT screen, a plasma screen with integrated speakers, or another media display device. Player 112 is coupled to Internet 106 to engage in transactions 116 and 132 with server 110.

Computer 114 is a computer comprising a processor, memory, output display, and input keyboard and mouse (not shown). In other embodiments of the present invention, computer 114 may be a cell phone, a PDA, or any other Internet-capable device. Computer 114 is configured to receive input from user 104 during transaction 122 via web browser 124 and is coupled to Internet 106 to engage in transaction 126 with server 110.

Server 110 is, in this embodiment, a computer comprising a processor and a memory, executing a server software to communicate with player 112 and computer 114 via Internet 106. In another embodiment of the present invention, server 110 can comprise two or more networked computers that run server software individually or in a distributed fashion. The memory of server 110 is utilized during a pairing process to store records 118, 128, and 130. Server 110 is coupled to Internet 106 to engage in transactions 116, 132 and 126 with player 112 and computer 114.

To begin a pairing process, user 104 loads disk 108 into player 112, thus starting transaction 116. In this embodiment, disk 108 has not previously been paired with a user account stored on server 110, so player 112 does not have a stored record of a user account, i.e. at the beginning of the pairing process account record 134 is not extant. Once disk 108 is loaded, player 112 retrieves and transmits the unique disk identifier of disk 108 and the unique player identifier of player 112 to server 110 via Internet 106.

After receiving the unique disk and player identifiers of disk 108 and player 112, server 110 continues transaction 116 by generating a unique key. In this embodiment, the key may be a hash computed by the server software from a server time code, based on the unique disk identifier and the unique player identifier. In other embodiments, the key may be generated by different functions, so long as the generated key is unique. After generating the key, server 110 stores the key, the unique disk identifier, and the unique player identifier in record 118 for subsequent use in the pairing process. To complete transaction 116, server 110 transmits the key to player 112 via Internet 106.

While waiting for server 110 to complete transaction 116, player 112 may provide, for example, a splash page or a progress indicator on the display. After transaction 116 has been completed, and player 112 has received the key generated by server 110, transaction 122 may begin. To begin transaction 122, player 112 replaces the splash page or progress indicator on the display with pairing instructions 120. Instructions 120 comprise the unique key, the Internet address of server 110 stored originally on disk 108, and a set of instructions for user 104. The set of instructions instructs user 104 on how to utilize computer 114 to perform transaction 126 during transaction 122.

User 104 utilizes computer 114 to perform transaction 126 by first connecting to server 110 by, in this embodiment, typing the Internet address in instructions 120 into web browser 124. Server software on server 110 functions as a web server for web browser 124, but in other embodiments server 110 and computer 114 may communicate via a different Internet protocol. Transaction 126 continues as server 110 communicates with web browser 124 to present user 104 with an account creation prompt. User 104 then creates a user account on server 110 by creating a username and password for the user account in the account creation prompt on web browser 124.

After creating the user account, server 110 communicates with web browser 124 to present user 104 with a key prompt. To complete transaction 126, user 104 enters the key displayed in instructions 120 into the key prompt on web browser 124. Once the key is entered, computer 114 transfers the key to server 110. Having received the key from user 104, server 110 creates and stores record 128, associating the key and the newly created user account, thus completing transaction 126.

After transaction 126, server 110 has sufficient information to pair the user account to disk 108. Previously, during transaction 116, server 110 created record 118 associating the key, the unique disk identifier, and the unique player identifier. At this point, after transaction 126, server 110 also has stored record 128, associating the key and the user account. Server 110 may thus execute software to match record 118 with record 128, because both contain the common key. Having matched records 118 and 128, server 110 creates record 130, associating the unique disk identifier and unique player identifier of record 118 with the user account of record 128. Additionally after transaction 126, user 104 concludes transaction 122 by confirming creation of the user account on server 110 to player 112 by, for example, operating a remote control (not shown) of player 112. Player 112, after being notified that transaction 126 is complete, concludes transaction 122.

After concluding transaction 122, transaction 132 can be performed. In transaction 132, player 112 requests the user account from server 110 via Internet 106. is Upon receiving the request for a user account from player 112, the server software executing on server 110 can look up record 130, which contains the unique player identifier of player 112. Server 110 can then transmit the user account, comprising the user name and password of user 104, to player 112, thus concluding transaction 132. Player 112 stores the user account in record 134.

At the conclusion of transactions 116, 122, 126, and 132, record 130 on server 110 and record 134 on player 112 include the result of the pairing process. Record 130 enables server 110 to maintain a user account accessible by user 104 via computer 114 or via player 112. Player 112, storing the user account in record 134, can access the user account on server 110 via Internet 106 with minimal input from user 104. If disk 108 is removed from player 112 and later reinserted, player 112 can contact server 110 with the user account stored in record 134 and confirm that disk 108 is paired with the user account.

Figure 2:
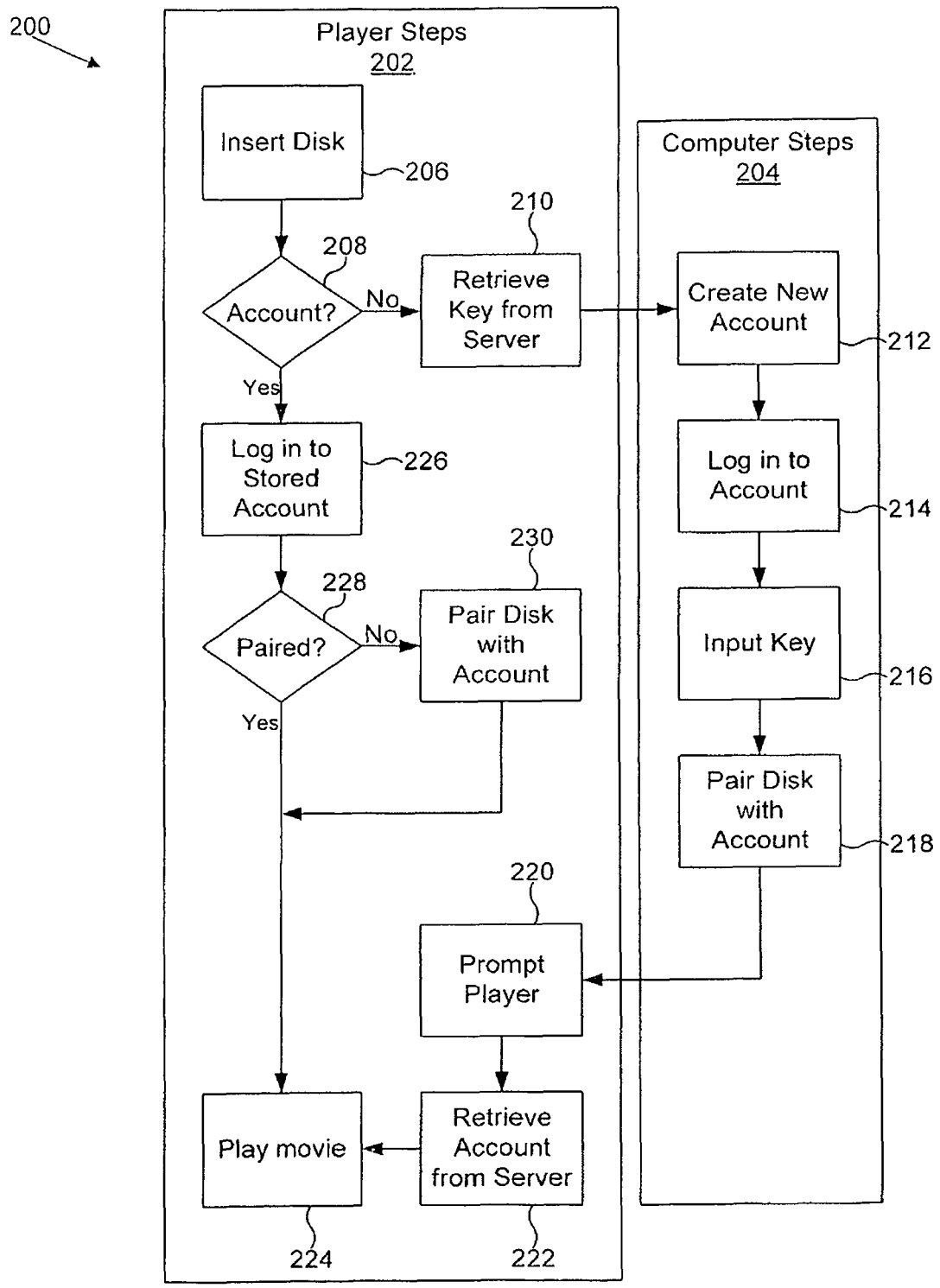
FIG. 2 is a flowchart presenting a method for pairing a medium to a user account, according to one embodiment of the present invention.

FIG. 2 shows flowchart 200 of an exemplary method for pairing a medium to a user account, according to one embodiment of the present invention. Certain details and features have been left out of flowchart 200 that are apparent to a person of ordinary skill in the art. For example, a step may comprise one or more substeps or may involve specialized equipment or materials, as known in the art. While steps 210 through 230 indicated in flowchart 200 are sufficient to describe one embodiment of the present invention, other embodiments of the invention may utilize steps different from those shown in flowchart 200.

Steps 206 through 230 of flowchart 200 occur either on a media player corresponding to player 112 in FIG. 1, shown as player steps 202, or on a computer corresponding to computer 114 in FIG. 1, shown as computer steps 204. Transaction 116 of FIG. 1 corresponds to step 210, transactions 122 and 126 of FIG. 1 correspond to steps 212 through 220, and transaction 132 corresponds to step 222.

Flowchart 200 begins in step 206 of player steps 202. In step 206, a user corresponding to user 104 inserts a disk corresponding to disk 108 into a player corresponding to player 112. Like disk 108, in this embodiment, the disk can be a Blu-ray movie disk, but in other embodiments the disk could he an instance of another media format, such as a DVD movie disk. Additionally, like player 112, the player can be a Blu-ray player.

In step 208 of flowchart 200, the player determines whether a user account is stored in the player in a record corresponding to record 134. If a user account is so stored, then flowchart 200 proceeds to step 226, but if a user account is not, flowchart 200 proceeds to step 210. In this embodiment, the player, corresponding to player 112, does not have a user account stored, so flowchart 200 proceeds to step 210.

In step 210 of flowchart 200, the player retrieves a key from a server (not shown) corresponding to server 110. The player first transmits a unique disk identifier of the disk and a unique player identifier of the player to the server, and the server utilizes both in addition to a server timestamp to compute a unique key. The key is stored on the server in a record corresponding to record 118, in addition to being transmitted to the player. After receiving the key, the player displays the key, the Internet address of the server, and a set of instructions on a display (not shown), such as an LCD display. The instructions, corresponding to instructions 120, instruct the user to perform steps 212 through 218 on a computer corresponding to computer 114 and then to return to the player.

In step 212 of flowchart 200, the user begins following the instructions on the display of the player by utilizing a web browser corresponding to web browser 124 of the computer to contact the server at the Internet address. As with system 100 of FIG. 1, other embodiments of the invention may use communication technology different from a computer web browser, such as a PDA, a cell phone, or another networked device. Once in contact with the server, the user completes step 212 by creating a new user account, and logs into the new user account in step 214.

In step 216 of flowchart 200, the user enters the key displayed in the instructions into the web browser. The computer transmits the key to the server, which creates a key and user account record corresponding to record 128. The server then executes server software to match the key and user account record to the key, player and disk record created during step 210. Once a match is found, the server pairs the user account with the disk in step 218, and the user returns to the player in step 220.

In step 220 of flowchart 200, the instructions the player displayed in step 210 instruct the user to prompt the player after pairing the disk and the user account in step 218. The user does so by, for example, operating the player with a remote control. Once prompted, in step 222 the player can reconnect to the server and request the newly created user account. In response, the server can identify the correct user account based on the unique player identifier of the player, and send the user account to the player. After completing step 222, the player has stored the user account, has been loaded with the disk, and may thus proceed to step 224 and play the disk for the user.

In prior step 208, the player did not have a stored user account, and thus the player proceeded from step 208 to step 210. If, after completing step 222 and watching the movie in step 224, the user repeats step 206 and inserts a second disk, a different path through flowchart 200 will be taken. The second disk requires the player to determine again whether a user account is stored on the player. In contrast with the first occurrence of step 206, after insertion of the second disk the player does have a user account stored. Thus, the player proceeds to step 226, instead of step 210.

In step 226 of flowchart 200, the player connects to the server and logs in to the user account. Once logged in to the server, the player in step 228 queries the server about whether the second disk is paired to the user account. If the second disk is the same Blu-ray title as the first disk, the server will respond affirmatively, and no action needs to be taken on the server, because the second disk is already effectively paired, and the player may proceed to step 224 and play the second disk. If, in contrast, the second disk is a different title than the first disk, the server will respond in the negative and the player will proceed to step 230.

In step 230 of flowchart 200, the server pairs the second disk with the user account and confirms to the player that the second disk has been so paired. Thus, a record on the server and a record on the player record the result of the pairing process of flowchart 200. The record on the server enables the server to maintain a user account accessible via the computer and via the player. The player can access user account features on the server without further input from the user. Once step 230 has been completed, the player may proceed to step 224 and play the second disk.

From the above description of the invention it is manifest that various techniques can be used for implementing the concepts of the present invention without departing from its scope. Moreover, while the invention has been described with specific reference to certain embodiments, a person of ordinary skill in the art would recognize that changes can be made in form and detail without departing from the spirit and the scope of the invention. It should also be understood that the invention is not limited to the particular embodiments described herein, but is capable of many rearrangements, modifications, and substitutions without departing from the scope of the invention.

What is claimed is:

1. A method for use by a media player for pairing a physical medium with a user account, the method comprising:
   retrieving, by the media player, a medium identifier from the physical medium, wherein the medium identifier uniquely identifies the physical medium;
   transmitting, by the media player, the medium identifier of the physical medium to a Server;
   receiving. by the media player and in response to the transmitting, a key associated with the medium identifier of the physical medium from the server; and
   receiving, by the media player and in response to the transmitting, pairing instructions for use by a user to pair, using a computer, the user account with the physical medium associated with the key.

2. The method of claim 1, further comprising:
   receiving the user account from the server by the media player.

3. The method of claim 2, further comprising:
   storing, by the media player, the user account on the media player.

4. The method of claim 1, wherein the transmitting the medium identifier of the physical medium to the server occurs via the Internet.

5. The method of claim 1, wherein the physical medium comprises a movie media disk.

6. The method of claim 1, wherein the user transfers the key from the media player to the computer.

7. A method for use by a server for pairing a physical medium with a user account, the method comprising:
   receiving, by the server, a medium identifier of the physical medium from the media player, wherein the medium identifier uniquely identifies the physical medium;
   generating, by the server, a key in response to the receiving;
   associating, by the server, the key with the medium identifier;
   transmitting, by the server and in response to the receiving, the key to the media player; and
   transmitting, by the server and in response to the receiving, pairing instructions for use by a user to pair, using a computer. the user account with the physical medium associated with the key.

8. The method of claim 7, further comprising receiving the key and the user account by the server from the computer for pairing the user account with the physical medium associated with the key.

9. The method of claim 8, wherein the server receives the key and the user account via the Internet.

10. The method of claim 7, wherein the server is configured to communicate with the media player via the Internet.

11. The method of claim 7, further comprising:
transmitting, by the server, the user account to the media player for storage on the media player.

12. A media player for pairing a physical medium with a user account, the media player comprising:
a processor configured to:
retrieve a medium identifier from the physical medium, wherein the medium identifier uniquely identifies the physical medium;
transmit the medium identifier of the physical medium to a server;
receive, in response to transmitting, a key associated with the medium identifier of the physical medium from the server; and
receive, in response to transmitting, pairing instructions for use by a user to pair, using a computer, the user account with the physical medium associated with the key.

13. The media player of claim 12, wherein the processor is configured to receive the user account from the server by the media player.

14. The media player of claim 13, wherein the processor is configured to store the user account in a memory Of the media player.

15. The media player of claim 12, wherein transmitting the medium identifier of the physical medium to the server occurs via the Internet.

16. The media player of claim 12, wherein the physical medium comprises a movie media disk.

17. The media player of claim 12, wherein the user transfers the key from the media player to the computer.

18. A server for pairing a physical medium with a user account, the server comprising:
a processor configured to:
receive a medium identifier of the physical medium from the media player, wherein the medium identifier uniquely identifies the physical medium;
generate a key in response to receiving the medium identifier;
associate the key with the medium identifier;
transmit, in response to receiving the medium identifier, the key to the media player; and
transmit, in response to receiving the medium identifier, pairing instructions for use by a user to pair, using a computer, the user account with the physical medium associated with the key.

19. The server of claim 18, wherein the processor is further configured to receive the key and the user account from the computer for pairing the user account with the physical medium associated with the key.

20. The server of claim 18, wherein the processor is further configured to transmit the user account to the media player for storage on the media player.

* * * * *

UNITED STATES PATENT AND TRADEMARK OFFICE
CERTIFICATE OF CORRECTION

Page 1 of 1

PATENT NO. : 9,065,870 B2
APPLICATION NO. : 14/268660
DATED : June 23, 2015
INVENTOR(S) : Prestenback et al.

It is certified that error appears in the above-identified patent and that said Letters Patent is hereby corrected as shown below:

In the Claims

Claim 1, column 6, line 34, "receiving." should be changed to --receiving,--

Claim 7, column 6, line 66, "computer." should be changed to --computer,--

Claim 14, column 7, line 31, "Of" should be changed to --of--

Signed and Sealed this
Fifteenth Day of September, 2015

Michelle K. Lee
*Director of the United States Patent and Trademark Office*